April 16, 1968   ERNST-GÜNTER FINKE ET AL   3,377,876
CHANGE GEAR TRANSMISSION
Filed Dec. 22, 1965   3 Sheets-Sheet 1
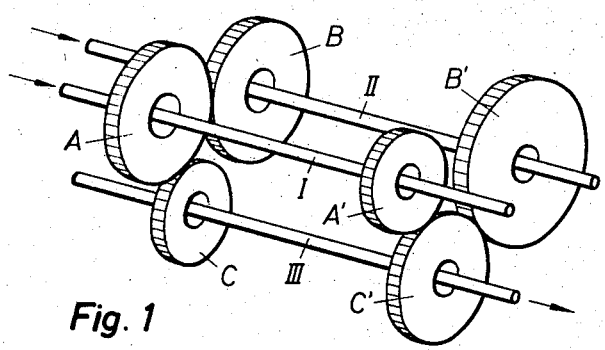
Fig. 1
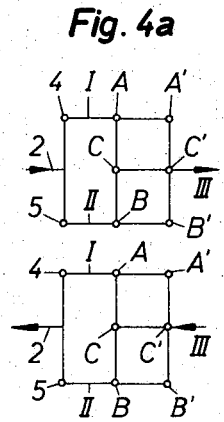
Fig. 4a
Fig. 4b
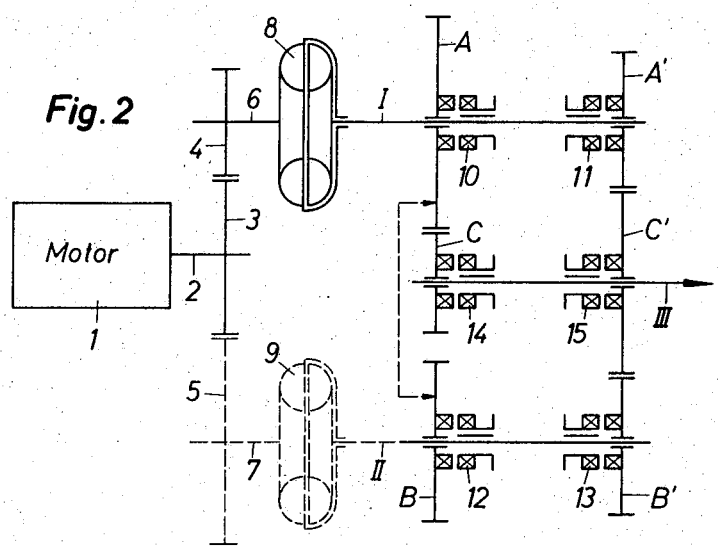
Fig. 2
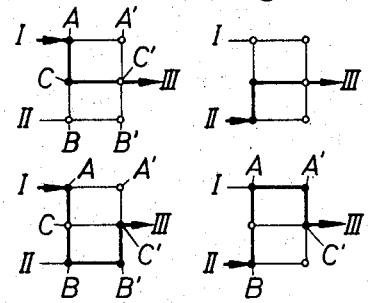
Fig. 3a   Fig. 3b   Fig. 3c   Fig. 3d
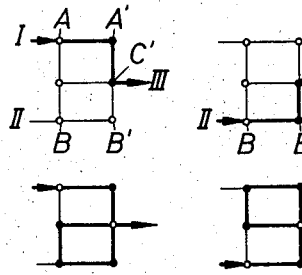
Fig. 3e   Fig. 3f   Fig. 3g   Fig. 3h
INVENTORS:
Ernst-Günter Finke
Friedrich Helfer
BY INVENTOR.
Ernst-Günter Finke
Friedrich Helfer
BY April 16, 1968 ERNST-GÜNTER FINKE ETAL 3,377,876
CHANGE GEAR TRANSMISSION
Filed Dec. 22, 1965 3 Sheets-Sheet 3
Fig. 9
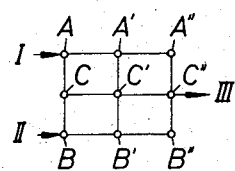
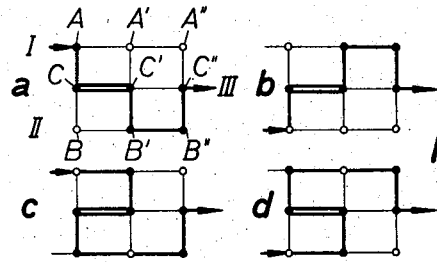
Fig. 11
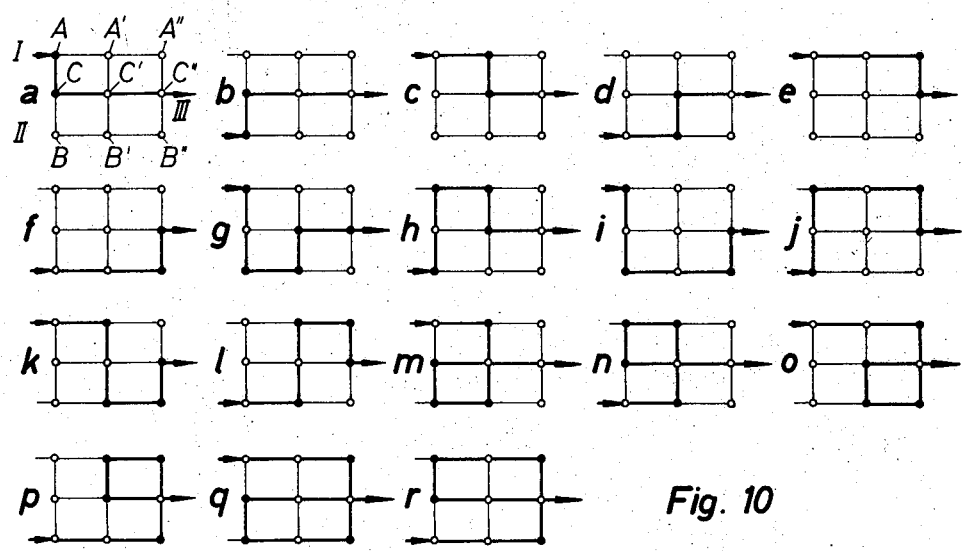
Fig. 10
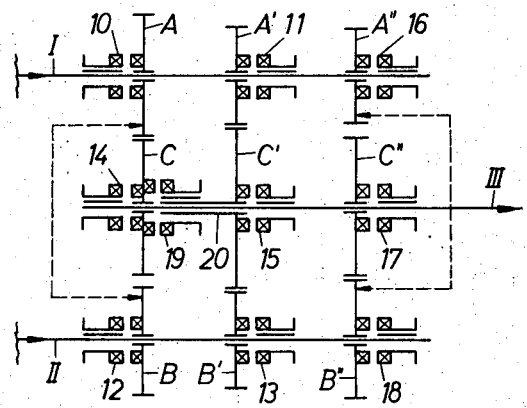
Fig. 12
INVENTOR.
Ernst-Günter Finke
Friedrich Helfer
BY United States Patent Office 3,377,876
Patented Apr. 16, 1968

3,377,876
CHANGE GEAR TRANSMISSION
Ernst-Günter Finke and Friedrich Helfer, Heidenheim, Germany, assignors to Voith Getriebe KG, Heidenheim (Brenz), Germany
Filed Dec. 22, 1965, Ser. No. 515,530
Claims priority, application Austria, Dec. 24, 1964, A 10,946/64
6 Claims. (Cl. 74—360)

ABSTRACT OF THE DISCLOSURE

Change speed transmission having a plurality of parallel shafts and gears on each shaft loose thereon and in driving relation to gears on the other shafts with a clutch for clutching each gear to its shaft, two of said shafts defining parallel power flow paths, and a power transmitting element in each path which can be made selectively operable for transmitting power.

The present invention relates to a change gear transmission with at least three parallel shafts one or more of which function as input shafts while a plurality or one of the remaining shafts function as output shafts. The input torque is conveyed through the input shaft or selectively through one of the input shafts while each of said shafts has arranged thereon at least two gears each of which is located with one gear of the other shafts in a common plane. With a heretofore known transmission of this type, which has two input shafts adapted selectively to be made effective and also has six gears, two gears are fixedly connected to the output shaft while the remaining shafts mesh with said gears and are adapted to be coupled to the respective shaft through the intervention of a shiftable jaw clutch and free-wheel drive interposed between said jaw clutches and said gears. This particular transmission has only four velocity ranges while in the first and third velocity range one input shaft conveys the input torque whereas in the second and fourth velocity range the other input shaft conveys the input torque, in the respective power path not under load the change over to the next higher or lower velocity range being prepared (so-called two-way transmission). The velocity range is made effective at the instant at which the torque transmission changes from one input shaft to the other input shaft. In this way an uninterrupted power conveying change over is obtained which is of particular importance when high loads in vehicles have to be transmitted.

It is an object of the present invention to provide a change gear transmission with a great number of velocity ranges which will require a minimum of structural elements and will be relatively inexpensive.

It is another object of this invention to provide a change gear transmission which will afford a considerable increase in the velocity ranges of a two-way transmission without increasing the number of transmission parts over heretofore known transmissions of the type involved.

These and other objects and advantages of the invention will appear more clearly from the following specification in connection with the accompanying drawings, in which:

FIG. 1 is a diagrammatic view of a change gear transmission according to the present invention with a distributing transmission.

FIG. 2 is a diagrammatic representation of the development of an eight velocity range change gear transmission with a distributing transmission.

Figure 5:
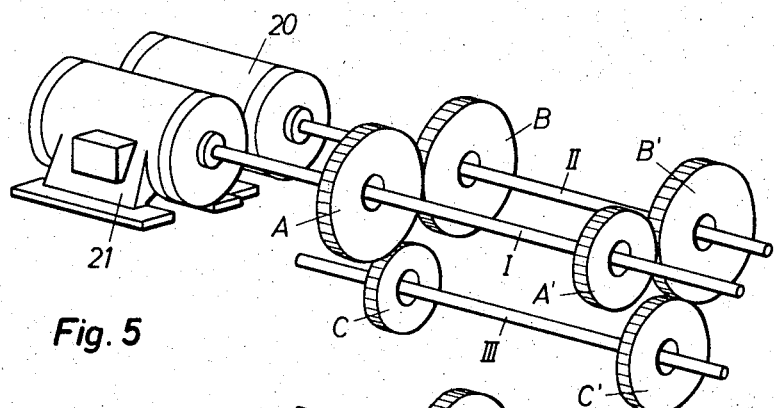
Figure 6:
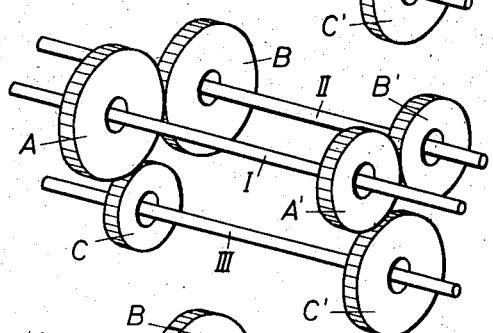
Figure 7:
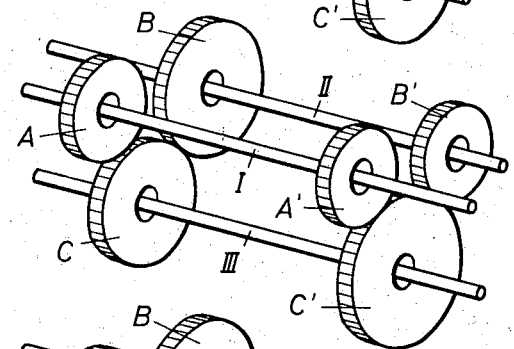
Figure 8:
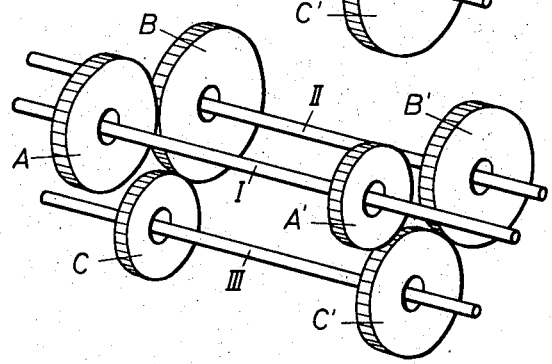

FIGS. 3a to 3h diagrammatically represent the course of the power flow in the individual velocity ranges of the change gear transmission according to FIGS. 1 and 2.

FIGS. 4a and 4b show the power flow of the transmission according to FIG. 1 with a different arrangement of the drive.

FIGS. 5 to 8 represent diagrammatic views of modified change gear transmissions according to the present invention.

FIG. 9 illustrates a power flow diagram of a change gear transmission with threee shafts and nine gears.

FIGS. 10a to 10r show the course of the power flow with the velocity ranges of the change gear transmission of FIG. 9.

FIGS. 11a to 11d illustrate the course of the power flow with such velocity ranges which are obtainable with a change gear transmission somewhat modified over that of FIG. 9.

FIG. 12 is a diagrammatic representation of the change gear transmission of FIGS. 11a to 11d.

In conformity with the present invention, a change gear transmission is provided in which with the above outlined structure, in each plane one of the gears is in permanent driving relation with each other gear solely over one path only while all gears at least of two planes are designed as loose wheels adapted to be coupled to the respective shaft pertaining thereto. The fact that in conformity with the present invention and in contrast to heretofore known transmissions each gear is shiftable as loose wheel, also permits the transfer of the torque via such loose wheel. In this way a considerable number of velocity ranges is obtained while the respective transmission ratio and the respective direction of rotation will depend on the selected number of teeth of the gears and their mesh with other gears, and with change gear transmissions with two input shafts will depend on the direction of rotation of the input shafts (for instance forward or rearward velocity ranges only or also forward and rearward velocity ranges). In contrast to heretofore know transmissions of the type involved, it is also possible with the transmission of the present invention that also the gears arranged on the input shafts or one input shaft will mesh with two or more other gears and that the meshing conditions in the individual planes vary from each other. With change gear transmissions comprising a plurality of input shafts, the input may be effected through input shafts from a single drive motor through the intervention of a distributing transmission or may be effected directly by a plurality of driving motors, the direction of rotation of the input shafts being the same or being opposite to each other.

The transmission according to the present invention may comprise for instance two input shafts and an output shaft with a total of six gears of which two respectively mesh with two other gears, and with six simple shiftable clutches, such as friction clutches, between the gears and the shafts. In this way a two-way transmission with eight velocity ranges is obtained which is particularly advantageous with regard to the number of gears and velocity ranges, whereas the above mentioned heretofore known structure with six gears and four jaw clutches and free wheel clutches each permits four velocity ranges only. With the transmission according to the present invention, the velocity ranges can likewise be shifted without interrupting the power flow by preparing the power path to be shifted into and then transferring the drive from one input shaft to the other. The requirement of structural elements in both instances (with the heretofore known structure four jaw clutches and four free wheel clutches—with the present invention six simple shiftable clutches) must be considered at the worst at least equal, actually the number of the structural elements is smaller with the transmission according to the present invention.

According to a further development of the present invention, with a change gear transmission at least three gears on each shaft (at least three planes) are provided of which two gears arranged directly adjacent to each other and mounted on one of the shafts, preferably on the output shaft, are adapted to be coupled to each other. This arrangement permits a further increase in the number of velocity ranges. Thus, with a change gear transmission according to the present invention, with nine gears on three shafts, in which already eighteen velocity ranges are available, it is possible by a single additional clutch between two gears on the output shaft to obtain four additional velocity ranges. Even though in many instances such a high number of velocity ranges is not required for a single transmission, such transmission may nevertheless be considered a standard transmission from which without taking advantage of the high number of velocity ranges, transmission types with different speed ranges may be derived.

Referring now to the drawings in detail, FIG. 1 diagrammatically shows a view of a change gear transmission according to the present invention which comprises three shafts and six gears, three gears each being arranged in one plane. Gears A, B and C form or are located in the first plane while gears A', B' and C' are arranged in or form the second plane. Gear A meshes with gears B and C, whereas gear C' meshes with gears A' and B'. Gears A and A' are freely rotatably supported by shaft I, gears B and B' are freely rotatably supported by shaft II, and gears C and C' are freely rotatably supported by shaft II. FIG. 2 illustrates the change gear transmission according to FIG. 1 in a development. Motor 1 drives the change gear transmission through a distributing drive comprising a gear 3 keyed to the motor shaft 2, a gear 4 keyed to a shaft 6 and a gear 5 keyed to a shaft 7. Gear 3 meshes with gears 4 and 5. Gears 4 and 5 have a different number of teeth. Connected to shafts 6 and 7 are the primary parts of fluid couplings 8 and 9 respectively the secondary parts of which are connected to change gear transmission shafts I and II respectively. The said couplings 8 and 9 are adapted selectively to be filled and emptied for respectively establishing and interrupting driving connection between shafts 6 and I and shafts 7 and II. Gears A, B, C and A', B' and C' form loose wheels on the input shafts I and II and on the output shaft III and are adapted by means of jaw clutches 10 to 15 to be coupled to the respective shaft.

The gear changing possibilities of the change gear transmission according to FIGS. 1 and 2 are diagrammatically illustrated in FIGS. 3a to 3h. The engaged jaw clutches are indicated by heavy solid dots while the non-engaged jaw clutches are represented by small circles. The effective power paths are indicated by heavy lines. In this connection it should be noted that the illustration of the heavy line, for instance in FIG. 3e, indicates that shaft I is drivingly connected to shaft II. Furthermore, although this line extends beyond the symbol for gear C, this does not mean that the power flow passes through gear C. It is furthermore to be noted that the solid line which does not contact the symbol for gear B' in FIG. 3c indicates that shafts I and III are drivingly interconnected. With regard to the transmission of FIG. 2, this means that the power flow passes from gear A' on shaft I to gear C' on shaft III while gear B' rotates idly on its shaft II.

As will be seen from FIG. 3, the change gear transmission of FIG. 2 has six gears and six jaw clutches and eight velocity ranges. In order to be able to effect a gear change-over without interrupting the power flow, shafts I and II have alternately to transmit the input torque. Furthermore, there must exist the possibility of engaging the jaw clutches for the next velocity range while the operation in the respective engaged velocity range continues. For the change gear transmission according to FIGS. 1 and 2 a gear combination is set forth below which permits the gear steps required in practice. The gears have the following number of teeth: A: 46; B: 20; C: 34; A': 20; B': 40 and C': 60. In this way the following subsequently upwardly and downwardly shiftable velocity ranges will be obtained without the necessity of interrupting the flow of power:

| Velocity Ranges | | Gears shifted in conformity with Figs. 3a to 3h | Transmission ratio, $i=n_2/n_{III}$ |
|---|---|---|---|
| Foward | 4th velocity range | 3h | 0.37:1 |
| | 3rd velocity range | 3a | 0.74:1 |
| | 2nd velocity range | 3d | 1.5:1 |
| | 1st velocity range | 3c | 3:1 |
| Rearward | do | 3b | 1.7:1 |
| | 2nd velocity range | 3g | 3.4:1 |

($n_2$ and $n_{III}$ designate the revolutions of shafts 2 and II respectively when gears 3, 4 and 5 have the same number of teeth.) From the above table it will be evident that the forward velocity ranges have an approximately geometric speed step with the factor 2. In addition to these six velocity ranges, two further rearward velocity ranges are possible which can be shifted without interrupting the power flow. From the first forward speed it is possible to shift to the third rearward speed by means of a gear meshing engagement in conformity with FIG. 3f and with $i=6.9:1$ and from the second forward speed the transmission may be shifted to the fourth rearward speed by means of a gear meshing engagement according to FIG. 3e and with $i=0.64:1$. Shifting operations from one of the lower forward velocity ranges to a rearward velocity range stepped up or stepped down to a high extent are of importance for certain vehicles, as for instance soil working machinery. Thus, a planing track laying vehicle when working on an incline must be able to effect a hill-up return while being under no load. A track laying vehicle of the above-mentioned type should also on a plane surface have a fast return under no load.

The transmission illustrated in FIG. 1 may also be employed as transmission with one input shaft only. In such an instance the dash line parts 5, 7 and 9 shown in FIG. 2 are superfluous and may be omitted (or parts 4, 6 and 8). Such a transmission permits four velocity ranges in conformity with the shift diagrams of FIGS. 3b, 3d, 3f and 3h and, more specifically, two forward velocity ranges and two rearward velocity ranges.

FIG. 4a illustrates the above described change gear transmission with two input shaft I and II and an output shaft III as well as the distributing transmission. FIG. 4b on the other hand shows that the same change gear transmission can also be employed with the power flow in opposite direction. In this instance shaft III represents the input shaft and shafts I and II represent the output shafts. The distributing transmission referred to above will then represent a collecting transmission and shaft 2 will then represent the output shaft of the total transmission.

FIGS. 5 to 8 illustrate further embodiments of a change gear transmission according to the present invention with two input shafts, an output shaft and six gears but with different gears in mesh with each other than is the case in the transmission of FIG. 2. The jaw clutches by means of which the gears can be connected to the shafts are not illustrated in these figures. FIG. 5 furthermore shows an individual drive of the input shafts I and II by means of two electric motors 20 and 21 respectively. The electric motors 20 and 21 are reversible and thus increase the possibilities of application of the change gear transmission while the direction of rotation of both electric motors may be the same or may be opposite to each other. Fundamentally also for the transmissions of FIGS. 5 to 8, the diagrams according to FIGS. 3a, to 3h are applicable.

With regard to the change gear transmissions according to FIGS. 1 and 5 to 8 there may additionally be mentioned that an exchange of the gear planes of a change gear transmission does not influence the sequence of the velocity ranges. However, by exchanging the two input shafts, it is possible, provided they have different speeds of rotation, to effect a different sequence of the velocity ranges. The location of the shafts relative to each other is furthermore determined only by the gears meshing with each other. Therefore, the centers of shafts I to III of the change gear transmission according to FIG. 7 may be located along a straight line. Sometimes it may be advantageous to arrange the output shaft as far as possible from the input shaft or shafts.

FIG. 9 illustrates a power flow diagram of a change gear transmission with three gear planes which is similar to the change gear transmission of FIG. 1 but is not illustrated in detail. This transmission, similar to the above mentioned change gear transmission, has three shafts I, II and III and spur gears A, B, C, A', B' and C' and differs from the above mentioned gears merely by the provision of three further spur gears A", B" and C" which are designed as loose wheels and are adapted by means of jaw clutches to be coupled to the respective shafts pertaining thereto. The third plane with gears A", B" and C" permits a considerably higher number of velocity ranges. Actually there are now available eighteen velocity ranges as will be evident from the diagram in FIGS. 10a to 10r. A further increase in the number of velocity ranges will be obtained by designing the gears C and C" of the transmission according to FIG. 9 so that they can be coupled to each other. In addition to the above mentioned eighteen velocity ranges, there may be realized four more velocity ranges. In FIGS. 11a to 11d there is illustrated the power flow of these four additional velocity ranges. It is to be understood that the coupling to each other of two gears arranged adjacent to each other on one and the same shaft is not limited to one single pair of gears.

FIG. 12 shows an example of a change gear transmission permitting the number of velocity ranges which have been mentioned in connection with the diagrams in FIGS. 11a to 11d. It is to be understood that the embodiment of the change gear transmission illustrated in FIG. 12 comprises the elements 1 to 9 as shown in FIG. 2, which elements, however, have not been shown in FIG. 12 for reasons of convenience. Furthermore, the transmission according to FIG. 12 is equipped with shafts I to III, gears A, A'; B, B'; C, C' and jaw clutches 10 to 15, as is the case in the transmission shown in FIG. 2. The change gear transmission of FIG. 12 differs, however, from that of FIG. 2 in that it comprises a third gear plane with gears A", B", C" loosely mounted on shafts I, II, III respectively and adapted to be coupled to the respective shaft by means of jaw clutches 16, 17, 18. In addition thereto, the transmission according to FIG. 12 comprises a further jaw clutch 19 by means of which a hollow shaft 20 and thereby the gear C' may be coupled to gear C.

It may also be mentioned that with a change gear transmission having four shafts and having an arrangement of the gears according to the present invention, two of these shafts may serve as input shafts and two other shafts may serve as output shafts. Generally, with each change gear transmission according to the present invention, it is possible with three and more shafts to change the function of the shafts to a great extent. Furthermore, with a change gear transmission having a plurality of output shafts, it is not under all circumstances necessary to have such change gear transmission followed by a collecting transmission. The output shafts may, for instance, individually be connected to the driving axles of a vehicle.

It is, of course, to be understood that the present invention is, by no means, limited to the various embodiments and arrangements referred to above but also comprises any modifications within the scope of the appended claims.

What we claim is:

1. A change gear transmission which includes: a first system forming input shaft means, a second system forming output shaft means, one of said systems comprising one shaft and the other one of said systems comprising two other shafts, said input shaft means and said output shaft means being arranged substantially parallel to each other, a plurality transmission gears, each of said shaft supporting at least two of said transmission gears in different longitudinal planes in such a way that each of said transmission gears on each said shaft is located in one and the same plane with one transmission gear of each other shaft, one of said transmission gears in each of said planes being permanently drivingly connected with each one of the other transmission gears of the respective plane along one single path only whereby the gears in each plane rotate together, the transmission gears in at least two of said planes being freely rotatable on the respective shafts supporting the same, and clutch means associated with said freely rotatable transmission gears and operable selectively to establish and interrupt driving connection between the respective freely rotatable transmission gear and the respective shaft supporting the same.

2. A change gear transmission according to claim 1, in which each of said shafts supports three transmission gears in three different planes and in which one of said shafts has two of said transmission gears arranged thereon adjacent to each other and adapted selectively to be drivingly connected to and disconnected from each other.

3. A gear change transmission according to claim 1, in which each of said shafts supports three transmission gears in three different planes, and in which said output shaft means comprises an output shaft having two of said transmission gears arranged thereon adjacent to each other and adapted selectively to be drivingly connected to and disconnected from each other.

4. A change gear transmission which includes; three shafts in parallel relation, at least two longitudinally spaced gears on each shaft, said gears being disposed in different planes with one gear on each shaft in each plane, said gears in each plane so meshing that rotation of any one thereof will cause rotation of the others in the same plane, each gear being freely rotatable on its respective shaft, clutch means pertaining to each gear and selectively operable for establishing and interrupting driving connection between the respective gear and its shaft, and respective means adapted to convey power connected to two of said shafts and each selectively adjustable between power conveying and non-power conveying conditions and each permitting rotation of the respective shaft when adjusted into non-power conveying condition.

5. A change gear transmission according to claim 4 in which said respective means adapted to convey power are fluid power transmissions adapted to be filled and emptied, and a fourth shaft drivingly connected to the sides of said fluid power transmissions opposite the sides thereof to which said two shafts are connected.

6. A change gear transmission according to claim 4 in which said respective means adapted to convey power are rotary electric power devices.

References Cited

UNITED STATES PATENTS

| 3,174,349 | 3/1965 | Renker, et al. | 74—665 |
| 3,214,987 | 11/1965 | Schenck et al. | 74—360 |
| 3,232,125 | 2/1966 | Lee et al. | 74—360 |

DONLEY J. STOCKING, *Primary Examiner.*

H. S. LAYTON, *Assistant Examiner.*